United States Patent
Wang

(10) Patent No.: US 10,164,389 B2
(45) Date of Patent: Dec. 25, 2018

(54) BREAKOUT ENCLOSURE FOR TRANSITIONING FROM TRUNK CABLE TO JUMPER CABLE

(71) Applicant: CommScope Technologies LLC, Hickory, NC (US)

(72) Inventor: Chi-Ming Wang, Chicago, IL (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/708,580

(22) Filed: Sep. 19, 2017

(65) Prior Publication Data
US 2018/0090895 A1 Mar. 29, 2018

Related U.S. Application Data

(60) Provisional application No. 62/399,600, filed on Sep. 26, 2016.

(51) Int. Cl.
| | |
|---|---|
| *H01R 13/502* | (2006.01) |
| *H01R 25/16* | (2006.01) |
| *H01R 13/73* | (2006.01) |
| *H01R 25/00* | (2006.01) |

(52) U.S. Cl.
CPC ......... *H01R 25/162* (2013.01); *H01R 13/502* (2013.01); *H01R 13/73* (2013.01); *H01R 25/003* (2013.01)

(58) Field of Classification Search
CPC .. H01R 25/003; H01R 25/006; H01R 25/161; H01R 25/162
See application file for complete search history.

(56) References Cited

U.S. PATENT DOCUMENTS

| | | |
|---|---|---|
| 5,202,538 A | 4/1993 | Skirpan |
| 5,938,462 A | 8/1999 | Wilson et al. |
| 6,045,399 A * | 4/2000 | Yu .................. H01R 25/003 439/214 |
| 6,340,250 B1 | 1/2002 | Auclair |

(Continued)

FOREIGN PATENT DOCUMENTS

| | | |
|---|---|---|
| KR | 10-2015-0006712 A | 1/2015 |
| WO | WO 2013/063045 A1 | 5/2013 |

(Continued)

OTHER PUBLICATIONS

U.S. Appl. No. 15/071,620, filed Mar. 16, 2016.

(Continued)

*Primary Examiner* — Ross Gushi
(74) *Attorney, Agent, or Firm* — Myers Bigel, P.A.

(57) ABSTRACT

An assembly for breaking out a trunk cable includes: a base having a generally flat surface adapted for mounting to a mounting surface; a shell having a front wall, two side walls extending from opposite sides of the front wall, and two opposed end walls, the side walls of the shell mounted to the base to form a cavity; a plurality of connectors mounted to each of the side walls; a trunk cable routed into the cavity through one of the end walls, the trunk cable comprising a plurality of power conductors; and at least one bus bar mounted to the shell within the cavity, at least one of the power conductors and at least one of the connectors in electrical connection with the bus bar.

18 Claims, 3 Drawing Sheets

(56) References Cited

U.S. PATENT DOCUMENTS

| | | | |
|---|---|---|---|
| 6,711,337 B2 | 3/2004 | Hodge et al. | |
| 6,993,237 B2 | 1/2006 | Cooke et al. | |
| 7,136,555 B2 | 11/2006 | Theuerkorn et al. | |
| 7,292,763 B2 | 11/2007 | Smith | |
| RE40,358 E | 6/2008 | Thompson et al. | |
| 7,477,824 B2 | 1/2009 | Reagan et al. | |
| 7,489,849 B2 | 2/2009 | Reagan et al. | |
| 7,791,864 B2 * | 9/2010 | Matyas | H01H 85/24 337/11 |
| 7,805,044 B2 | 9/2010 | Reagan et al. | |
| 7,837,397 B2 | 11/2010 | Fingler et al. | |
| 7,844,158 B2 | 11/2010 | Gronvall et al. | |
| 7,893,567 B1 | 2/2011 | Deros et al. | |
| 8,275,228 B2 | 9/2012 | Livingston et al. | |
| 8,401,387 B2 | 3/2013 | Biegert et al. | |
| 8,532,490 B2 | 9/2013 | Smith et al. | |
| 8,565,571 B2 | 10/2013 | Kimbrell et al. | |
| 8,792,767 B2 | 7/2014 | Fabrykowski et al. | |
| 8,929,740 B2 | 1/2015 | Smith et al. | |
| 9,069,151 B2 | 6/2015 | Conner | |
| 9,078,287 B2 | 7/2015 | Khemakhem et al. | |
| 9,606,320 B2 | 3/2017 | Wang | |
| 9,742,176 B2 | 8/2017 | Wang | |
| 2005/0163448 A1 | 7/2005 | Blackwell, Jr. et al. | |
| 2005/0175307 A1 | 8/2005 | Battey et al. | |
| 2005/0213921 A1 | 9/2005 | Mertesdorf et al. | |
| 2006/0056782 A1 | 3/2006 | Elkins, II et al. | |
| 2006/0093303 A1 | 5/2006 | Reagan et al. | |
| 2009/0226181 A1 | 9/2009 | Fingler et al. | |
| 2011/0097052 A1 | 4/2011 | Solheid et al. | |
| 2012/0008257 A1 | 1/2012 | Rebers et al. | |
| 2012/0295486 A1 | 11/2012 | Petersen et al. | |
| 2013/0084050 A1 | 4/2013 | Vastmans et al. | |
| 2013/0088407 A1 | 4/2013 | King et al. | |
| 2013/0108227 A1 | 5/2013 | Conner | |
| 2013/0146355 A1 | 6/2013 | Strasser et al. | |
| 2014/0140671 A1 | 5/2014 | Islam | |
| 2014/0199079 A1 | 7/2014 | Smith et al. | |
| 2015/0219856 A1 | 8/2015 | Wang | |
| 2015/0270637 A1 | 9/2015 | Islam et al. | |
| 2015/0270654 A1 | 9/2015 | Islam et al. | |
| 2016/0266326 A1 | 9/2016 | Gniadek | |
| 2016/0276817 A1 | 9/2016 | Wang | |

FOREIGN PATENT DOCUMENTS

| | | |
|---|---|---|
| WO | WO 2013/165831 A1 | 11/2013 |
| WO | 2015/186067 | 12/2015 |

OTHER PUBLICATIONS

International Search Report and Written Opinion for corresponding PCT Application No. PCT/US2015/014347, dated May 15, 2015.

Supplemental European Search Report corresponding to European Application No. 15746886.9, dated Aug. 22, 2017.

Notification Concerning Transmittal of International Preliminary Report on Patentability for corresponding PCT Application No. PCT/US2016/022600 dated Sep. 28, 2017.

International Search Report and Written Opinion for corresponding PCT Application No. PCT/US2016/022600, dated Jun. 27, 2016.

Notification of Transmittal of the International Search Report and the Written Opinion of the International Searching Authority, or the Declaration for corresponding PCT Application No. PCT/US2017/052133, dated Jan. 11, 2018.

International Search Report and Written Opinion Corresponding to International Application No. PCT/US2016/068273; dated Feb. 21, 2017; 12 Pages.

Notification of Transmittal of the International Search Report and the Written Opinion of the International Searching Authority, or the Declaration corresponding to International Application No. PCT/US2018/023244 dated Jun. 22, 2018.

Notification Concerning Transmittal of International Preliminary Report on Patentability for corresponding PCT Application No. PCT/US2016/068273 dated Jul. 19, 2018.

* cited by examiner

BREAKOUT ENCLOSURE FOR TRANSITIONING FROM TRUNK CABLE TO JUMPER CABLE

RELATED APPLICATION

The present application claims priority from and the benefit of U.S. Provisional Patent Application No. 62/399,600, filed Sep. 26, 2016, the disclosure of which is hereby incorporated herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

In co-assigned and co-pending U.S. patent application Ser. No. 14/448,269, filed Jul. 31, 2014, the disclosure of which is hereby incorporated herein in its entirety, devices are described that provide a solution to some of the issues described above. The devices discussed therein comprise an enclosure having mixed media connectors in one or two walls to receive jumper cables. A hybrid fiber-power trunk cable is routed to the bottom wall of the enclosure, then is routed within the enclosure to the mixed media connectors. The trunk cable is either attached to the enclosure via a trunk cable connector, which is then connected with the mixed media connectors, or is routed through a cable gland in the bottom wall of the enclosure and connected with the mixed media connectors. Co-assigned and co-pending U.S. patent application Ser. No. 15/071,620, filed Mar. 16, 2016 (also incorporated herein by reference in its entirety), discusses a number of embodiments of enclosures, some of which have side walls for mounting mixed media connectors that form a triangular or trapezoidal cross-section.

SUMMARY

As a first aspect, embodiments of the invention are directed to an assembly for breaking out a trunk cable, comprising: a base having a generally flat surface adapted for mounting to a mounting surface; a shell having a front wall, two side walls extending from opposite sides of the front wall, and two opposed end walls, the side walls of the shell mounted to the base to form a cavity; a plurality of connectors mounted to each of the side walls; a trunk cable routed into the cavity through one of the end walls, the trunk cable comprising a plurality of power conductors; and at least one bus bar mounted to the shell within the cavity. At least one of the power conductors and at least one of the connectors are in electrical connection with the bus bar.

As a second aspect, embodiments of the invention are directed to an assembly for breaking out a trunk cable comprising: a base having a generally flat surface adapted for mounting to a mounting surface; a shell having a front wall, two side walls extending from opposite sides of the front wall, and two opposed end walls, the side walls of the shell mounted to the base to form a cavity; a plurality of connectors mounted to each of the side walls; a trunk, cable routed into the cavity through one of the end walls, the trunk cable comprising a plurality of power conductors; and a platform configured for mounting of components (such as an OVP unit) residing in the cavity.

As a third aspect, embodiments of the invention are directed to an assembly for breaking out a trunk cable comprising: a base having a generally flat surface adapted for mounting to a mounting surface; a shell having a front wall, two side walls extending from opposite sides of and flaring, outwardly from the front wall, and two opposed end walls, the side walls of the shell mounted to the base to form a cavity; a plurality of connectors mounted to each, of the side walls; a hybrid trunk cable routed into the cavity through one of the end walls, the trunk cable comprising a plurality of power conductors and a plurality of optical fibers; and two bus bars mounted to the shell within the cavity. Each of the bus bars is positioned adjacent a free edge of a respective side wall. At least one of the power conductors and at least one of the connectors are in electrical connection with each bus bar.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., an assembly, a housing, a cable, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
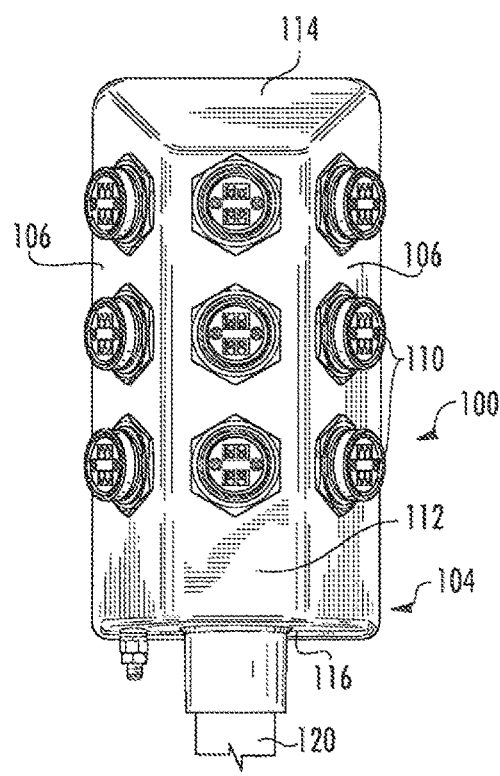
FIG. 1 is a perspective view of an exemplary enclosure according to embodiments of the present invention.
Figure 2:
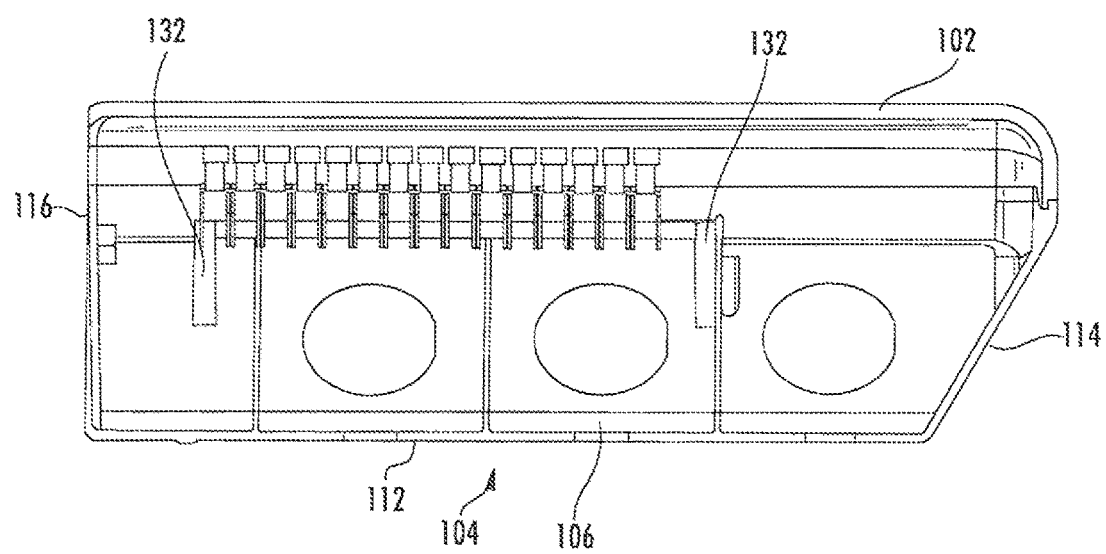
FIG. 2 is a section view of the enclosure of FIG. 1 with the conductors and optical fibers removed for clarity.

Referring now to the figures, a breakout enclosure for distributing power and fiber from a hybrid trunk cable is shown in FIG. 1 and designated broadly at 100. The enclosure has a base 102 (FIG. 2) and a shell 104 that mate to form the hollow enclosure 100. The shell 104 includes side walls 106, a front wall 112, a top wall 114 and a bottom wall 116 through which a cable 120 is routed. The shell 104 is generally trapezoidal in cross-section, with the side walls 106 flaring outwardly from the front wall 112 (this arrangement may provide a reduced wind loading). Mixed media/hybrid connectors 110 are mounted on the side walls 106 and the front wall 112. The base 102 is generally flat and is configured for attachment to a pole or other mounting apparatus after the enclosure 100 is pulled up to a desired location on an antenna tower.

The enclosure 100 illustrated therein is exemplary only; other enclosures, including those shown in U.S. patent application Ser. No. 15/071,620, supra, may be suitable. Exemplary materials for the enclosure 100 include thermoplastics. In some embodiments, the pieces of the enclosure may be formed by injection molding.

It will also be apparent to those of skill in this art that the enclosure may include different numbers of connectors. For example, enclosures including six connectors (in both 3×2 and 2×3 arrangements), eight connectors (in a 2×4 arrangement), and twelve connectors (in a 3×4 arrangement) may also be employed; in the 2×3 and 2×4 arrangements, the enclosure may include only an short arced front wall (without any connectors mounted thereon), which can save space and provide less wind resistance.

Figure 3:
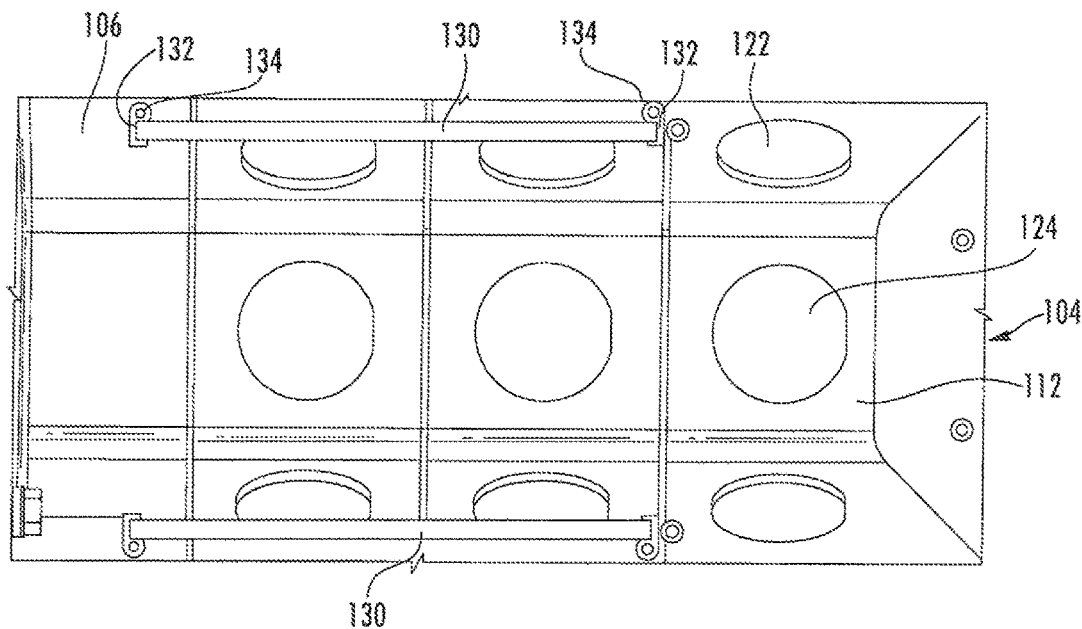
FIG. 3 is a top view of the shell of the enclosure of FIG. 1, with the terminals, optical fibers and conductors removed for clarity.
Figure 4:
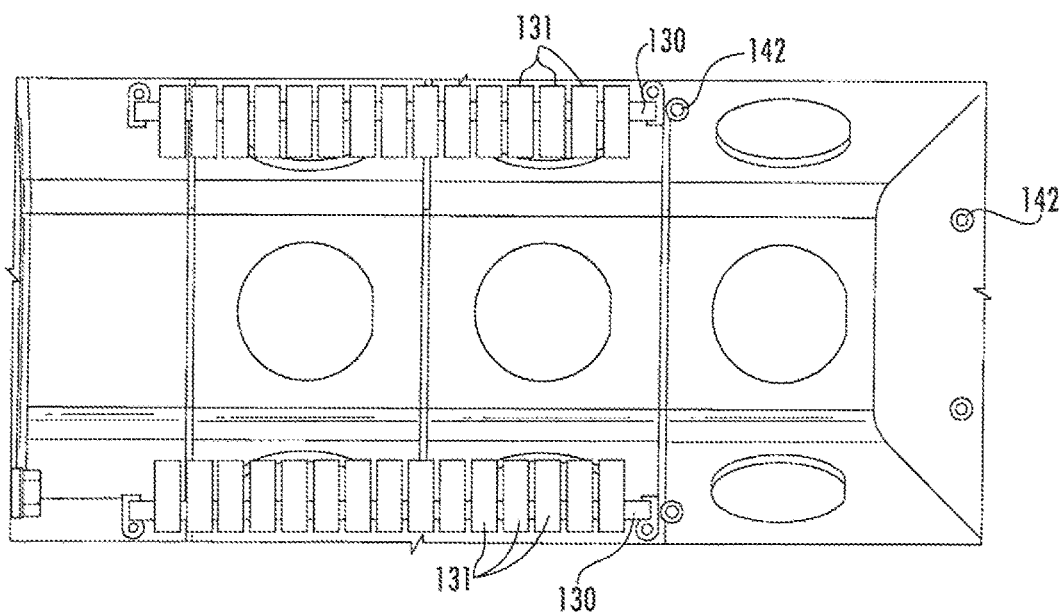
FIG. 4 is a top view of the shell of FIG. 3, with the optical fibers and conductors removed for clarity.

Referring, now to FIGS. 2-5, the interior of the enclosure 100 is shown therein. Referring first to FIG. 3, the interior side of the shell 104 is shown. As can be seen therein, holes 122 are present in the side walls 106 to provide mounting locations for the connectors 110. Holes 124 are also present in the front wall 112 to provide mounting locations for connectors 110.

Two copper bus bars 130 are mounted near the free edges of the side walls 106 and extend parallel to the length of the shell 104. The bus bars 130 are mounted in supports 132 extending from each side wall 106 that capture the ends of the bus bars 130. In the illustrated embodiment, the bus bars 130 are further secured with screws (not shown) inserted into bosses 134 in the supports 132. Typically, one bus bar 130 may be used to provide power (often −48V) in parallel, and the other bus bar 130 may be used to provide the return path in parallel (more commonly the return path is arranged in parallel).

The bus bars 130 are positioned to be connected with power conductors of the hybrid cable 120 and to the connectors 110; such connections may be formed by welding, clamps, sockets or the like. In the illustrated embodiment, terminals 131 are mounted in electrical contact with the bus bars 130 and are employed to interconnect various components via the bus bars 130 (see FIGS. 2 and 4). For example, in the illustrated embodiment, fifteen terminals 131 are mounted on each bus bar 130; five of the terminals 131 are connected with conductors 120a from the hybrid trunk cable 120 (see FIG. 5); nine of the terminals 131 are connected via a conductor 120b with a respective hybrid connector 110 (FIG. 5); and one terminal 131 is attached via a conductor (not shown) to an overvoltage protection unit (OVP unit) (not shown in FIGS. 2-6).

Those skilled in this art will appreciate that different numbers of terminals 131 may be employed, and that the terminals 131 may be omitted entirely if the conductors are interconnected via other means. For example, the conductors 120, 120a, 120b may be welded, soldered, or spliced to the bus bars 130 to achieve electrical interconnection.

Figure 5:
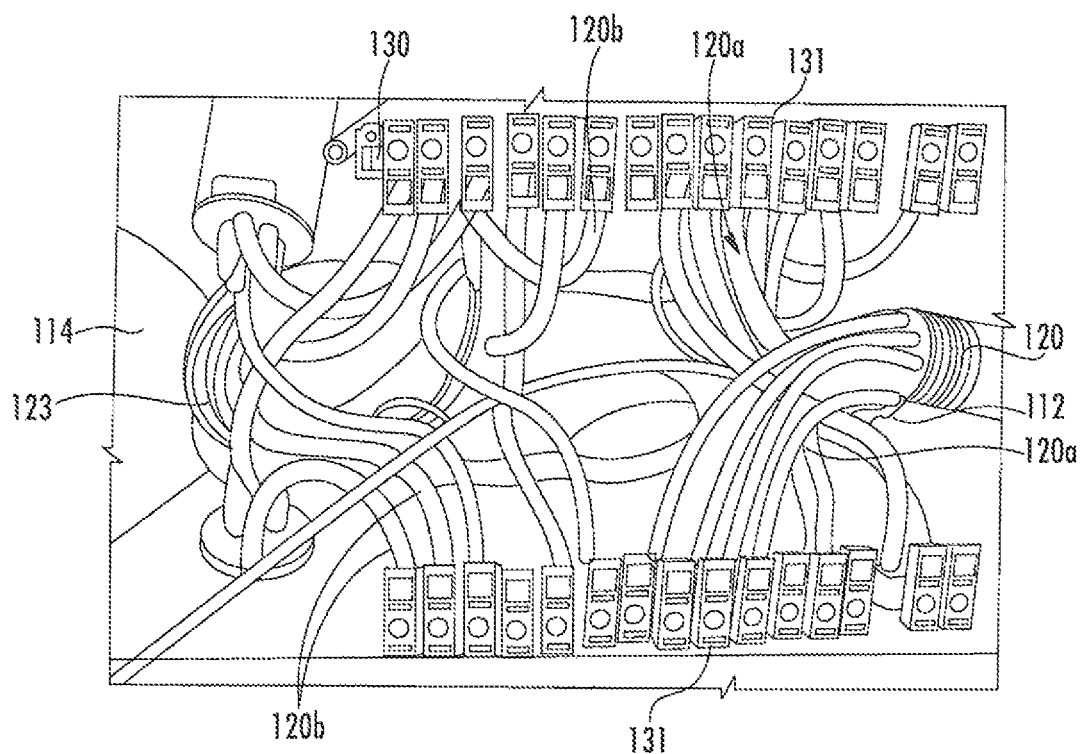
FIG. 5 is a top view of the shell of FIG. 3 with the conductors and optical fibers present.

As can be seen in FIG. 5, the bus bars 130 are positioned within the cavity of the enclosure 100 to avoid interfering with or impeding routing of the conductors 120 and/or the fibers 123 of the cable 120 and additional conductors 120a, 120b traveling within the enclosure 100. In particular, the positioning of the bus bars 130 adjacent the free edges of the side walls 106 of the wider end of the shell 104 can provide additional space for the routing of conductors 120a, 120b and/or optical fibers 123, and for manipulating conductors/fibers during assembly. Moreover, such positioning can provide additional space for the coiling and bending of optical fibers 123 near the narrower portion of the shell 104 near the front wall 112 to satisfy minimum bend radius requirements that the optical fibers 123 may have. Also, the positioning of the bus bars 130 can provide space for additional components of the enclosure 100, such as an OVP unit or circuit breaker.

Those skilled in this art will appreciate that other arrangements of bus bars may be employed. For example, rather than one bus bar 130 being included per side, two, three or more bus bars may be included. As an example, two or three bus bars may be mounted in the enclosure collinearly, such that the separate bus bars extend essentially the same length within the enclosure as the bus bars 130 discussed above. The separate bus bars may be of the same length or different lengths as desired. Such arrangements may be particularly suitable for larger enclosures (e.g., 3×4 configurations) to enable power to be managed more precisely. For example, multiple bus bars can be used to accommodate different system configurations (all parallel, some parallel/some single, given numbers of sets of parallel conductors, etc.). Also, this connection method may be employed in lieu of butt splicing, even without creating any parallel connections, because it may offer the advantage of stabilizing the conductors in a desired location, rather than being free-floating like butt splices. In some instances the positions of the conductors may assist in maintaining the fibers in position. Additionally, multiple bus bars may be used to create a single parallel portion (e.g., the return portion) while leaving other portions (e.g., the −48V) as individual circuits.

Also, in some embodiments, it may be advantageous to arrange the bus bars to extend across the width, rather than along the length, of the shell of the enclosure. In such an arrangement, the bus bars would (as described above) typically be mounted across the wider edges of the shell, with the optical fibers residing in the narrower portion of the shell as discussed above. It may also be advantageous to include multiple bus bars on the same side of the enclosure in different vertical locations e.g., the bus bars may be stacked, staggered and/or tiered relative to each other).

Figure 6:
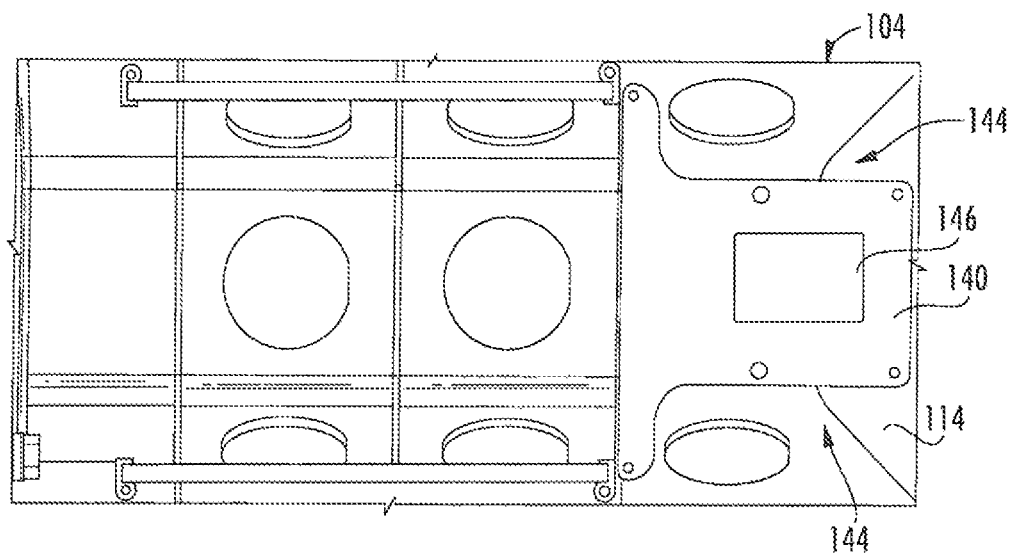
FIG. 6 is a top view of the shell of FIG. 3 with a platform included.

Referring now to FIG. 6, a platform 140 is located at the end of the shell 104 adjacent the top wall 114. The platform 140 is mounted to the shell 104 with four bosses 142 (see FIG. 4). The platform 140 can enable the addition of components such as an OVP unit 146 and/or a circuit breaker. Cutouts 144 are included in the sides of the platform 140 to provide space for the routing of conductors 120a, 120b and optical fibers 123 to and from components mounted on or near the platform 140 to the connectors 110.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An assembly for breaking out a trunk cable, comprising:
    a base having a generally flat surface adapted for mounting to a mounting surface;
    a shell having a front wall, two side walls extending from opposite sides of the front wall, and two opposed end walls, the side walls of the shell mounted to the base to form a cavity;
    a plurality of connectors mounted to each of the side walls;
    a trunk cable routed into the cavity through one of the end walls, the trunk cable comprising a plurality of power conductors and a plurality of optical fibers; and
    at least one bus bar mounted to the shell within the cavity, at least one of the power conductors and at least one of the connectors in electrical connection with the bus bar.

2. The assembly defined in claim 1, wherein the at least one bus bar is two bus bars.

3. The assembly defined in claim 2, wherein each bus bar is positioned adjacent a free edge of a respective side wall.

4. The assembly defined in claim 1, further comprising, terminals mounted on the at least one bus bar.

5. The assembly defined in claim 4, wherein the power conductors of the trunk cable are connected to the terminals, and wherein conductors are routed between the terminals and the connectors.

6. The assembly defined in claim 1, wherein the optical fibers reside adjacent the front wall.

7. The assembly defined in claim 1, wherein the shell is configured such that the side walls flare outwardly from the front wall.

8. The assembly defined in claim 1, wherein the at least one bus bar is at least two bus bars on each side of the enclosure.

9. An assembly for breaking out a trunk cable, comprising:
    a base having a generally flat surface adapted for mounting to a mounting surface;
    a shell having a front wall, two side walls extending from opposite sides of the front wall, and two opposed end walls, the side walls of the shell mounted to the base to form a cavity;
    a plurality of connectors mounted to each of the side walls;
    a trunk cable routed into the cavity through one of the end walls, the trunk cable comprising a plurality of power conductors and a plurality of optical fibers; and
    a platform configured for mounting of components residing in the cavity.

10. The assembly defined in claim 9, wherein the platform is positioned adjacent the end wall opposed to the end wall through which the trunk cable is routed.

11. The assembly defined in claim 9, wherein the platform includes cutaway areas for routing of conductors.

12. The assembly defined in claim 9, further comprising an overvoltage protection unit mounted on the platform.

13. The assembly defined in claim 9, further comprising two bus bars mounted to the shell within the cavity, the power conductors and the connectors in electrical connection with the bus bars.

14. The assembly defined in claim 13, wherein each bus bar is positioned adjacent a free edge of a respective side wall.

15. The assembly defined in claim 13, further comprising terminals mounted on the bus bars.

16. The assembly defined in claim 15, wherein the power conductors of the trunk cable are connected to the terminals, and wherein conductors are routed between the terminals and the connectors.

17. The assembly defined in claim 9, wherein the optical fibers reside adjacent the front wall.

18. An assembly for breaking out a trunk cable, comprising:
    a base having a generally flat surface adapted for mounting to a mounting surface;
    a shell having a front wall, two side walls extending from opposite sides of and flaring outwardly from the front wall, and two opposed end walls, the side walls of the shell mounted to the base to form a cavity;
    a plurality of connectors mounted to each of the side walls;
    a hybrid trunk cable routed into the cavity through one of the end walls, the trunk cable comprising a plurality of power conductors and a plurality of optical fibers; and
    two bus bars mounted to the shell within the cavity, each of the bus bars positioned adjacent a free edge of a respective side wall, at least one of the power conductors and at least one of the connectors in electrical connection with each bus bar.

* * * * *